(12) United States Patent
Warsi et al.

(10) Patent No.: US 7,452,020 B2
(45) Date of Patent: Nov. 18, 2008

(54) SELF LOCATING BRACKET

(75) Inventors: Aamir Warsi, Howell, MI (US); Robert Joseph Hazlewood, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 274 days.

(21) Appl. No.: 11/259,770

(22) Filed: Oct. 27, 2005

(65) Prior Publication Data

US 2007/0096493 A1    May 3, 2007

(51) Int. Cl.
*B60N 2/20* (2006.01)
(52) U.S. Cl. .............................. 296/65.17; 297/378.13
(58) Field of Classification Search ... 296/65.16–65.18; 297/378.13
See application file for complete search history.

(56) References Cited

U.S. PATENT DOCUMENTS 2,859,797 A * 11/1958 Mitchelson .................. 297/61
4,637,648 A * 1/1987 Okino et al. .................. 296/63
7,032,973 B2 * 4/2006 Reubeuze .............. 297/378.13

FOREIGN PATENT DOCUMENTS

JP    2001-341558    12/2001
JP    2003-070585    3/2003

* cited by examiner

*Primary Examiner*—Dennis H Pedder
(74) *Attorney, Agent, or Firm*—Gifford, Krass, Sprinkle, Anderson & Citkowski, P.C.

(57) ABSTRACT

A bracket assembly allows assembly of a seat back frame to an attachment bar in a vehicle. The bracket assembly includes a locating bracket and a hook. The locating bracket is fixedly secured to the seat back frame. The locating bracket has a slot for receiving the attachment bar therein. The locating bracket has a bore adapted for lockingly engaging a fastener. The hook is pivotally coupled to the locating bracket for movement between a receiving position in which the hook is presented for hooking engagement with the attachment bar and a locked position in which the attachment bar is constrained between the hook and the slot of the locating bracket. The hook has a hole. The bore of the locating bracket and the hole of the hook are aligned in the locked position, such that the fastener can be inserted therethrough to retain the hook in the locked position.

17 Claims, 3 Drawing Sheets

SELF LOCATING BRACKET

BACKGROUND OF THE INVENTION

1. Field of the Invention

The invention relates to seat assemblies for automotive vehicles. More specifically, the invention relates to a bracket assembly that facilitates installation of the seat assembly into the vehicle.

2. Description of the Related Art

Automotive vehicles typically include seat assemblies for supporting occupants of the vehicles above a floor in the vehicle. A seat assembly typically includes a seat cushion and a seat back that supports the back of an occupant seated on the seat cushion. A conventional seat back assembly includes a rigid frame; a foam pad that is supported on the frame; and a textile, leather or vinyl trim cover that covers both the foam pad and the frame. In some instances the seat cushion and the seat back are installed into the vehicle as separate components. Where the seat back is provided as a separate component from the seat cushion, the frame of the seat back will often be fitted with at least three brackets that allow the seat back assembly to be fixedly secured to a back passenger compartment wall of a vehicle.

During assembly of the seat back to the vehicle, however, it is often difficult to install bolts through the brackets on the seat back frame; more specifically, it is difficult to hold the seat back in place while driving bolts through both the bracket and corresponding holes found on the vehicle chassis. Accordingly, it remains desirable to provide a seat back assembly design that provides a means of locating the seat back assembly relative to the vehicle and facilitates installation of the bolts through the brackets and into the vehicle.

SUMMARY OF THE INVENTION

According to one aspect of the invention, a bracket assembly is provided for attaching a seat back frame to an attachment bar in a vehicle. The bracket assembly includes a locating bracket and a hook. The locating bracket is fixedly secured to the seat back frame. The locating bracket has a slot for receiving the attachment bar therein. The locating bracket has a bore adapted for lockingly engaging a fastener. The hook is pivotally coupled to the locating bracket for movement between a receiving position in which the hook is presented for hooking engagement with the attachment bar and a locked position in which the attachment bar is constrained between the hook and the slot of the locating bracket. The hook has a hole. The bore of the locating bracket and the hole of the hook are aligned in the locked position, such that the fastener can be inserted therethrough to retain the hook in the locked position.

According to another aspect of the invention, a seat back assembly is provided for a vehicle. The seat back assembly includes a frame and a bracket assembly. The frame is adapted to be pivotally coupled to the vehicle. The bracket assembly is fixedly secured to the frame to allow assembly of the frame to an attachment bar in the vehicle. The bracket assembly has a locating bracket and a hook. The locating bracket is fixedly secured to the seat back frame. The locating bracket has a slot for receiving the attachment bar therein. The locating bracket has a bore adapted for lockingly engaging a fastener. The hook is pivotally coupled to the locating bracket for movement between a receiving position in which the hook is presented for hooking engagement with the attachment bar and a locked position in which the attachment bar is constrained between the hook and the slot of the locating bracket. The hook has a hole. The bore of the locating bracket and the hole of the hook are aligned in the locked position, such that the fastener can be inserted therethrough to retain the hook in the locked position.

According to another aspect of the invention, a seat assembly is provided for a vehicle. The seat assembly includes an actuator, a frame and a bracket assembly. The actuator is coupled to the vehicle. The actuator has an arm driven in a selectively reciprocal manner along a substantially linear path. The arm has an attachment bar fixedly secured thereto for movement therewith. The frame is adapted to be pivotally coupled to the vehicle. The bracket assembly is fixedly secured to the frame to allow assembly of the frame to an attachment bar in the vehicle, wherein the bracket assembly has a locating bracket and a hook. The locating bracket is fixedly secured to the seat back frame. The locating bracket has a slot for receiving the attachment bar therein. The hook is pivotally coupled to the locating bracket for movement between a receiving position and a locked position. The hook in the receiving position is presented for hooking engagement with the attachment bar. The attachment bar is pivotally coupled between the slot of the locating bracket and the hook in the locked position, such that the frame pivots relative to the vehicle in response to corresponding movement of the arm along the substantially linear path.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
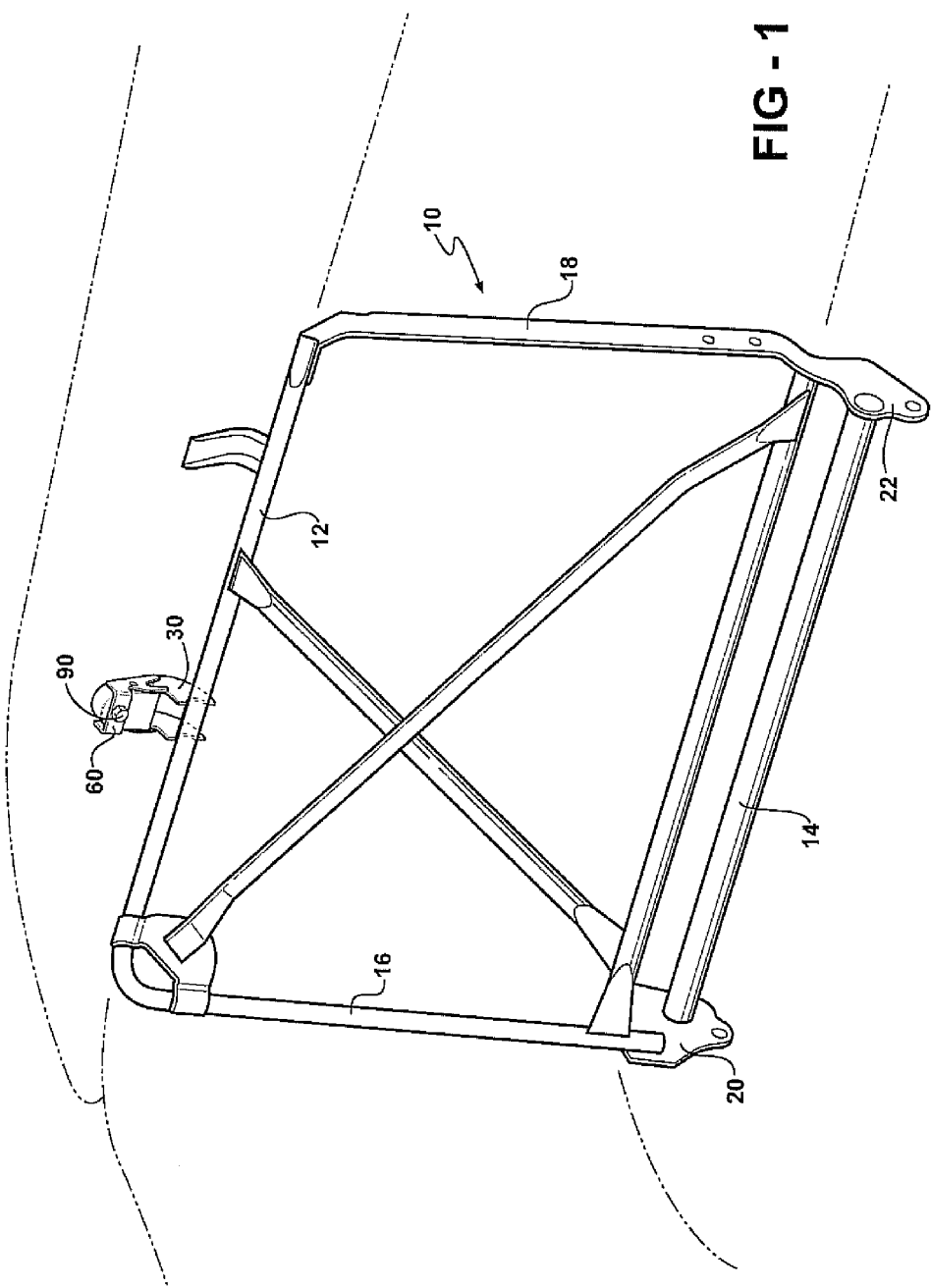
FIG. 1 is perspective view of a seat back frame having a locating bracket and hook according to one embodiment of the invention.

According to one embodiment of the invention, a bracket assembly is provided for attaching a seat back frame to an attachment bar in a vehicle. The bracket assembly includes a locating bracket 30 and a hook 60, which are described in greater detail below.

Referring to the figures, the frame of the seat back is generally indicated at 10. The frame 10 includes an upper cross member 12, a lower cross member 14, and a pair of side members 16, 18 extending between both the upper 12 and lower 14 cross members to form a generally rectangular shaped frame. Preferably, the members 12, 14, 16, 18 of the frame are constructed using conventional bent and welded tubing as known by those having ordinary skill in the art. Brackets 20, 22 are provided along the lower ends 24, 26 of the side members 16, 18 for pivotally coupling the lower ends 24, 26 of the side members 16, 18 to the vehicle using bolts.

Figure 4:
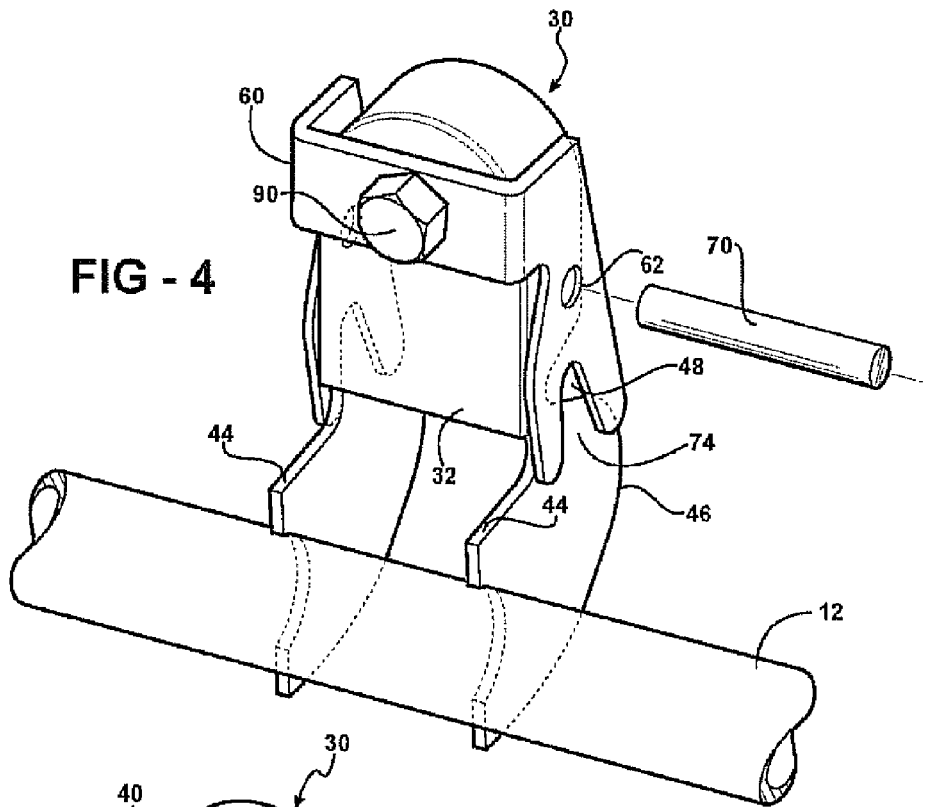
FIG. 4 is an enlarged perspective view of the seat back frame, locating bracket and hook, with the hook secured in the locked position.
Figure 5:
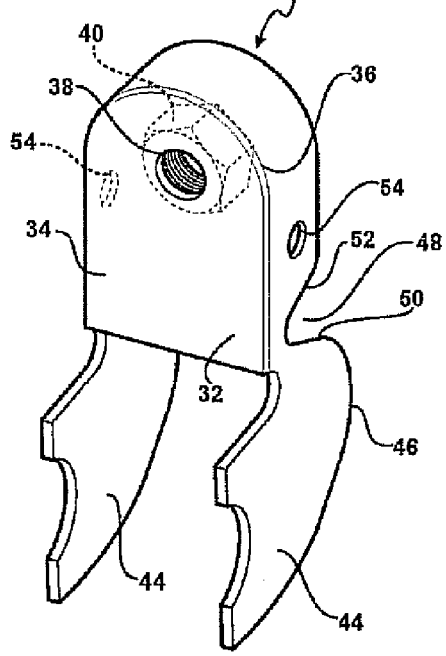
FIG. 5 is a perspective view of the locating bracket.
Figure 6:
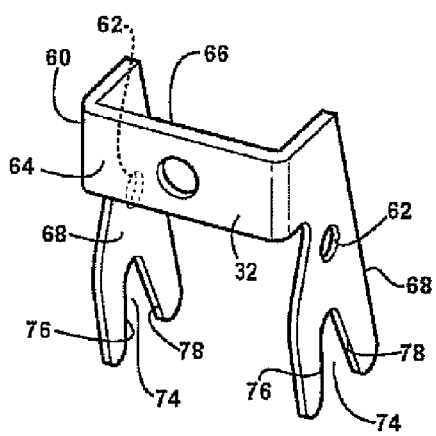
FIG. 6 is a perspective view of the hook.

As shown in FIGS. 4 and 5, the locating bracket 30 is fixedly secured to a middle portion of the upper cross member 12. The locating bracket 30 includes a substantially planar main wall 32 having opposite outer 34 and inner 36 surfaces. A bore 38 is formed in the main wall 32 extending through both the outer 34 and inner 36 surfaces. A threaded nut 40 is fixedly secured by welding to the inner surface 36 of the main wall 32. The nut 40 is axially aligned with the bore 38. Optionally, the nut 40 is omitted and the bore 38 is extruded and threaded with the same thread pitch as the nut 40.

The locating bracket 30 also has spaced apart and generally parallel side walls 44. The side walls 44 extend generally orthogonally from the inner surface 36 of the main wall 32. Each side wall 44 has a distal edge 46 spaced apart from the inner surface 36 of the main wall 32. Corresponding locating slots 48 are defined along the distal edges 46 of the side walls 44. Each slot 48 extends toward the main wall 32. Each end of each slot 48 is circular-shaped so that a striker or attachment bar can be seated thereon. Each slot 48 includes ramped edges 50, 52 for guiding the attachment bar toward the end of the slot 48. Axially aligned holes 54 are formed in the side walls 44.

Figure 2:
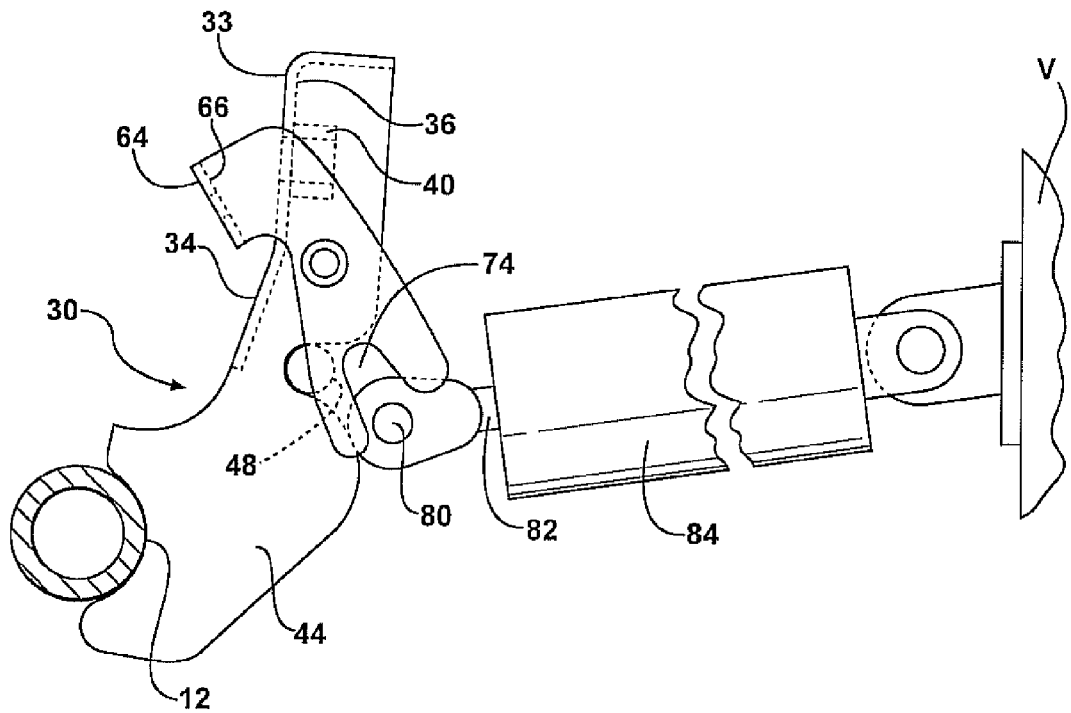
FIG. 2 is a cross sectional view of the seat back frame, locating bracket and hook, with the hook in a receiving position.
Figure 3:
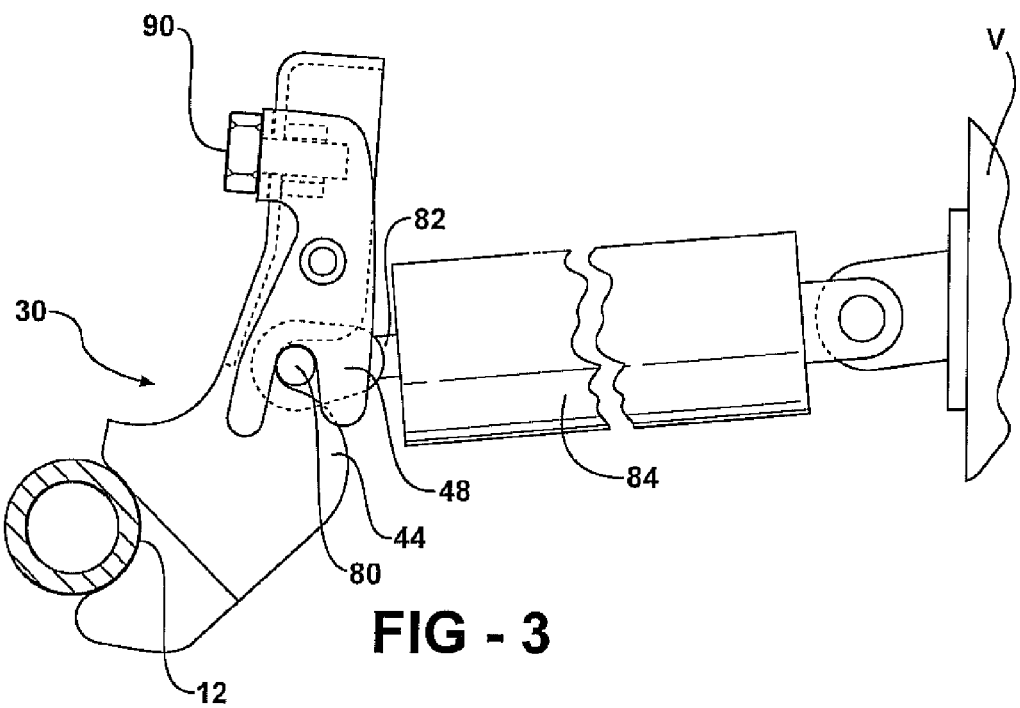
FIG. 3 is a cross sectional view of the seat back frame, locating bracket and hook, with the hook in a locked position.

The locking hook 60 is pivotally coupled to the locating bracket 30. More specifically, the hook 60 includes a main wall 62 having opposite outer 64 and inner 66 surfaces. A hole or bore 62 is formed in the main wall 62 of the hook 60. The bore 62 extends through both the outer 64 and inner 66 surfaces of the main wall 62 of the hook 60. The hook 60 has spaced apart side walls 68 that are generally parallel with and abut respective side walls 44 of the locating bracket 30. Each side wall 68 of the hook 60 has holes 62 axially aligned with the holes 54 in the locating bracket 30. A pivot pin 70 extends through the holes 54, 62 for pivotally connecting the locking hook 60 to the locating bracket 30. The hook 60 is movable between a receiving position, as shown in FIG. 2, and a locked position, as shown in FIG. 3. Preferably, the hook 60 is biased by a spring (not shown) toward the receiving position. Alternatively, the hook 60 is weighted such that the center of gravity of the hook 60 is offset relative to the pivot pin 70, so that gravity maintains the hook 60 in the receiving position.

Each side wall 68 of the hook 60 includes a lower edge having a slot 74 that extends longitudinally toward the pivot pin 70. Each end of each slot 74 is circular shaped so that the attachment bar can be seated therein. Each slot 74 includes angled edges 76, 78 for guiding the attachment bar toward the end of the slot 74.

In use, the side walls 44 of the locating bracket 30 are fixedly secured to the upper cross member 12 of the frame 10 by welding, bolting, or other fixing means known by those having ordinary skill in the art. The brackets 20, 22 are pivotally coupled to the vehicle using bolts. The seat back 10 is pivoted toward the attachment bar 80 fixedly secured to a distal end of a moving arm 82 of an actuator 84. The actuator 84 can be coupled to a vehicle with the moving arm 82 operable to be driven in a selectively reciprocal manner along a substantially linear path. The attachment bar 80 engages the lower-most edge 76 of the slot 74 of the hook 60, thereby causing the hook 60 to pivot about the pivot pin 70 in a clockwise direction (as viewed in the figures) from the receiving position in FIG. 2 toward the locked position in FIG. 3. As the hook 60 moves toward the locked position, the attachment bar 80 engages the lower-most edge 50 of the slot 48 of locating bracket 30.

When the hook 60 is in the locked position, the attachment bar 80 is positioned at the end of each slot 48, 74 of the locating bracket 30 and hook 60. Also, the inner surface 66 of the main wall 62 of the hook 60 abuts the outer surface 34 of the main 32 of the locating bracket 30. A bolt 90 is inserted through the bores 38, 62 in the hook 60 and locating bracket 30, respectively. The bolt 90 is then threadingly engaged with the nut 40, thereby retaining the hook 60 in the locked position. The slots 74 of the hook 60 constrain the attachment bar 80 in a horizontal direction in the vehicle, while the slots 48 of the locating bracket 30 constrain the attachment bar 80 in the vertical direction. Thus, the attachment bar 80 is pivotally coupled between the slots 48, 74 of the locating bracket 30 and the hook 60. Actuation of the actuator 84 causes displacement of the moving arm 82. The displacement of the moving arm 82, in turn, causes corresponding pivotal movement of the seat back 10 relative to the vehicle.

Alternatively, the nut 40 and bolt 90 are omitted, and replaced by a barb-type fastener that is inserted through the bores 38, 62 in the hook 60 and locating bracket 30, respectively, to retain the hook 60 in the locked position.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A bracket assembly for attaching a seat back frame to an attachment bar in a vehicle, said bracket assembly comprising:
   a locating bracket fixedly secured to the seat back frame, said locating bracket having a first main wall, a side wall and a slot for receiving the attachment bar therein;
   said first main wall having opposite outer and inner surfaces, said first main wall also having a bore extending through said outer and inner surfaces;
   said side wall extending outwardly from said inner surface of said first main wall and having a distal edge, said slot formed along said distal edge; and
   a hook pivotally coupled to said locating bracket for movement between a receiving position in which said hook is presented for hooking engagement with the attachment bar and a locked position in which the attachment bar is constrained between said hook and said slot of said locating bracket,
   said hook and said locating bracket fixedly secured to each other to maintain said hook when said hook is in said locked position.

2. A bracket assembly as set forth in claim 1, wherein said bore is adapted for lockingly engaging a fastener.

3. A bracket assembly as set forth in claim 2, wherein said hook has a hole, said bore of said locating bracket and said hole of said hook being aligned in said locked position, such that said fastener can be inserted therethrough to retain said hook in said locked position.

4. A bracket assembly as set forth in claim 1, wherein said bore is extruded and threaded for threadingly engaging a fastener, wherein said fastener is a bolt.

5. A bracket assembly as set forth in claim 1, including a nut fixedly secured to said inner surface of said first main wall, said nut being axially aligned with said bore for threadingly engaging a fastener, wherein said fastener is a bolt.

6. A bracket assembly as set forth in claim 3, wherein said hook includes a main wall, said hole being defined in said hook main wall, said hook further including a side wall extending outwardly from said hook main wall.

7. A bracket assembly as set forth in claim 6, wherein said hook side wall and said locating bracket are pivotally coupled to each other by a pivot pin for pivotal movement of said hook relative to said locking bracket between said receiving and locked positions.

8. A bracket assembly as set forth in claim 6, wherein said hook side wall includes a slot for receiving the attachment bar in said locked position.

9. A bracket assembly as set forth in claim 8, wherein said slot of said hook and said slot of said locating bracket are substantially orthogonal relative to each other in said locked position, such that the attachment bar is constrained from movement along a direction substantially normal to a longitudinal axis of the attachment bar.

10. A seat back assembly for a vehicle, said seat back assembly comprising:
   a frame adapted to be pivotally coupled to the vehicle;
   a bracket assembly fixedly secured to said frame to allow assembly of said frame to an attachment bar in the vehicle, said bracket assembly having:
   a locating bracket fixedly secured to said seat back frame, said locating bracket having a main wall, a side wall and a slot for receiving the attachment bar therein;
   said main wall having opposite outer and inner surfaces, said main wall also having a bore extending through said outer and inner surfaces;
   said side wall extending outwardly from said inner surface of said main wall and having a distal edge, said slot formed along said distal edge; and
   a hook pivotally coupled to said locating bracket for movement between a receiving position in which said hook is presented for hooking engagement with the attachment bar and a locked position in which the attachment bar is constrained between said hook and said slot of said locating bracket, said hook also having a hole;
   said bore of said locating bracket and said hole of said hook being aligned in said locked position, such that a fastener can be inserted therethrough to retain said hook in said locked position.

11. A bracket assembly as set forth in claim 10, wherein said bore is extruded and threaded for threadingly engaging said fastener, wherein said fastener is a bolt.

12. A bracket assembly as set forth in claim 10, including a nut fixedly secured to said inner surface of said main wall, said nut being axially aligned with said bore for threadingly engaging said fastener, wherein said fastener is a bolt.

13. A seat assembly for a vehicle, said seat assembly comprising:
   an actuator for coupling to the vehicle, said actuator having an arm selectively with an attachment bar fixedly secured thereto for movement therewith;
   a frame adapted to be pivotally coupled to the vehicle;
   a bracket assembly fixedly secured to said frame to allow assembly of said frame to an attachment bar in the vehicle, wherein said bracket assembly having:
   a locating bracket fixedly secured to said seat back frame, said locating bracket having a slot for receiving the attachment bar therein;
   a hook pivotally coupled to said locating bracket for movement between a receiving position and a locked position, said hook in said receiving position being presented for hooking engagement with the attachment bar, said attachment bar being pivotally coupled between said slot of said locating bracket and said hook in said locked position, such that said frame pivots relative to the vehicle in response to corresponding movement of said arm.

14. A seat assembly as set forth in claim 13, wherein said locating bracket includes a bore adapted for lockingly engaging a fastener, said hook having a hole aligned with said bore of said locating bracket when said hook is in said locked position, such that said fastener can be inserted therethrough to retain said hook in said locked position.

15. A bracket assembly as set forth in claim 13, wherein said locating bracket includes a main wall having opposite outer and inner surfaces, said main wall having a bore extending through said outer and inner surfaces.

16. A bracket assembly as set forth in claim 15, wherein said bore is extruded and threaded for threadingly engaging said fastener, wherein said fastener is a bolt.

17. A bracket assembly as set forth in claim 15 including a nut fixedly secured to said inner surface of said main wall, said nut being axially aligned with said bore for threadingly engaging said fastener, wherein said fastener is a bolt.

* * * * *